April 21, 1970 A. TALEFF 3,507,004

ENCAPSULATING APPARATUS

Filed Oct. 17, 1967 3 Sheets-Sheet 1

ENCAPSULATING APPARATUS

Filed Oct. 17, 1967

WITNESSES

Theodore F. Wrobel

James F. Young

INVENTOR

Alexander Taleff

BY

Donald R. Lackey

ATTORNEY

United States Patent Office 3,507,004
Patented Apr. 21, 1970

3,507,004
ENCAPSULATING APPARATUS
Alexander Taleff, Pittsburgh, Pa., assignor to Westinghouse Electric Corporation, Pittsburgh, Pa., a corporation of Pennsylvania
Filed Oct. 17, 1967, Ser. No. 675,815
Int. Cl. B29c *6/00*
U.S. Cl. 18—4 14 Claims

ABSTRACT OF THE DISCLOSURE

Apparatus for encapsulating electrical conductors in a castable electrical insulating system, where molds containing the electrical apparatus to be encapsulated are indexed through a vacuum chamber having three zones. The first and third zones are connected to a first vacuum system, for selectively providing a predetermined vacuum therein, and the second zone is maintained at this predetermined vacuum by a second vacuum system. The vacuum chamber includes sealable doors at each end thereof, and controllable gate valves between the zones, which are all controlled in a predetermined sequence, along with the first vacuum system, to enable a mold to be loaded into the first zone, indexed through the second zone, where it is filled with the castable electrical insulating material, and unloaded from the third zone, without removing the vacuum from the second zone.

BACKGROUND OF THE INVENTION

Field of the invention

The invention relates in general to encapsulated electrical apparatus, and more particularly to new apparatus for continually vacuum casting a resinous electrical insulating system about electrical conductors.

Description of the prior art

Prior art methods and apparatus for encapsulating electrical apparatus, such as electrical coils, windings, and bushings, in a cast solid electrical insulating system, commonly utilize a "batch" concept. The mold containing the electrical apparatus to be encapsulated is placed in a vacuum chamber, the air is removed from the vacuum chamber to a predetermined low pressure, the mold and its contents are held at this low pressure for a sufficient length of time to insure that substantially all of the air is removed from the mold and the electrical apparatus, the encapsulating resin system is poured into the mold, the vacuum is maintained for a predetermined period of time after pouring in order to remove as much air as possible from the poured resin system, the chamber is brought back to atmospheric pressure, and the mold is removed from the vacuum chamber. While this process is satisfactory when limited quantities are required, its drawbacks are immediately apparent when the production requirements are increased. Increased production means that more vacuum chambers and more operating personnel will be required. Thus, the cost per encapsulated piece remains at the relatively high level of the batch process, regardless of how many separate batch installations are made. Each installation requires the same initial cost, floor space, maintenance, and operating personnel.

Accordingly, it would be desirable to provide new and improved apparatus for encapsulating electrical conductors in a castable resin system, which requires less floor space and fewer operating personnel, resulting in a lower cost per encapsulated piece, than prior art apparatus for comparable production rates.

SUMMARY OF THE INVENTION

Briefly, the present invention includes a single inline vacuum casting machine, having a vacuum chamber sealable with doors at both of its ends, and three zones provided by two spaced gate valves within the vacuum chamber. The first zone is for loading the molds, the third zone is for unloading the molds, and the second zone, which is disposed intermediate the first and third zones, is for the vacuum pouring of the encapsulating resin. A conveyor having a plurality of independently controllable sections or segments in disposed completely through the vacuum chamber for indexing the molds. A first vacuum system provides and maintains a predetermined vacuum in zone II, and a second vacuum system selectively provides this predetermined vacuum in zones I and III. The vacuum in zone II is always maintained, by operating the doors, gate valves, the second vacuum system, and conveyors in a predetermined sequence, which results in an indexed flow of molds through the vacuum chamber without removing the vacuum in the second zone. The second zone includes a plurality of index positions prior to the mold filling position, which insures that the molds and their contents will be under vacuum for the necessary period of time, and a predetermined number of index positions after the mold filling position, to insure that the poured resin system is sufficiently evacuated. The mold filling index position includes an elevator for lifting the molds, so the top of the mold is at a predetermined height for filling by the resin dispensing means, which allows mold sizes to be readily changed, or even mixed during the process cycle. The mold filling index position is also incrementally indexable, in order to accommodate molds having multiple sprues.

DESCRIPTION OF PREFERRED EMBODIMENTS

Figure 2:
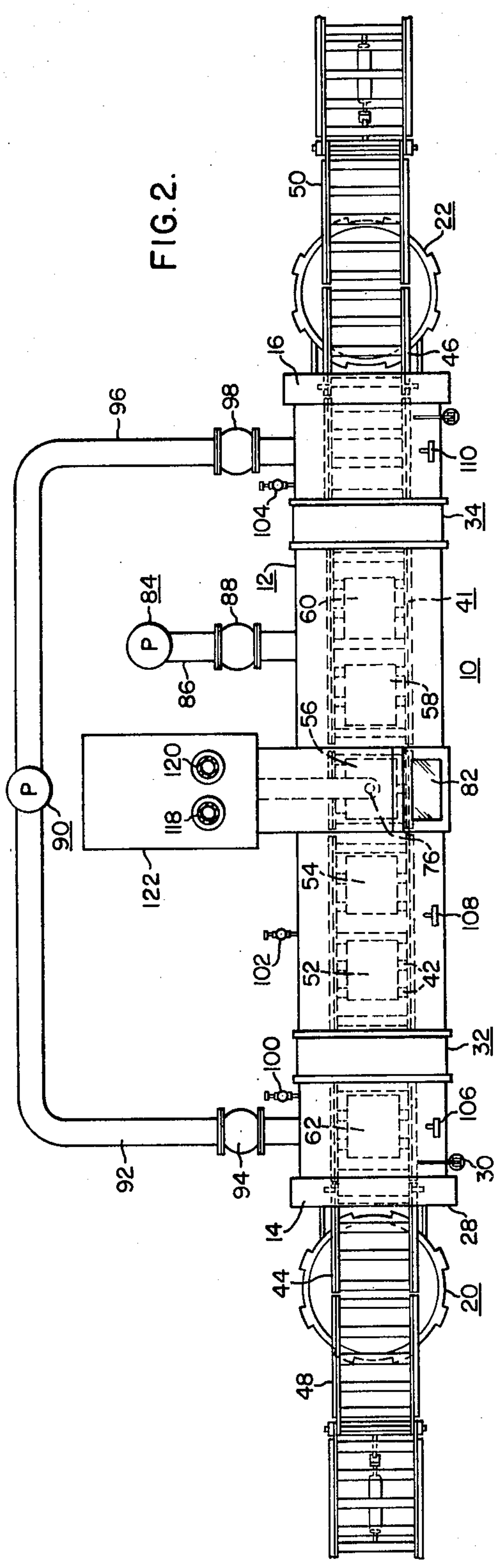
FIG. 2 is a plan view of the vacuum casting machine shown in FIG. 1.

The invention includes new and improved apparatus for encapsulating electrical conductors, such as coils, windings, and bushing studs, with a castable electrical insulating system, such as an epoxy resin system. The new apparatus increases the production rate of producing encapsulated electrical apparatus, without requiring a concomitant increase in floor, operating personnel and apparatus, thus reducing the cost per piece of the encapsulated apparatus compared to that obtainable with batch type methods.

Basically, the apparatus for encapsulating electrical conductors in a castable resin system includes a vacuum chamber which is divided into three zones. The first and third zones are for loading and unloading the molds, and the second zone is for vacuum pouring the resin system into the molds. The second zone is continuously provided with a predetermined vacuum, while the first and third zones are selectively provided with the predetermined vacuum, as required to transfer the molds between the first and second and the second and third zones, without losing the vacuum in the second zone. By maintaining the pouring zone continuously at the predetermined vacuum, there is no time lost in pumping the vacuum, and returning the chamber to atmospheric pressure, as in prior art methods.

In prior art methods, considerable time is lost while the mold and its contents are at the predetermined vacuum, due to the time the mold and its contents must be subjected to the vacuum in order to remove substantially all of the air therefrom, prior to the pouring step, and due to the time the filled mold must be subjected to the vacuum after the pouring step, in order to remove substantially all of the air from the poured resin system. This disadvantage is overcome by providing a plurality of index positions within the second zone of the vacuum chamber, with the pouring step taking place at an intermediate index position. Thus, the time required for the mold and conductors to be at vacuum prior to and after pouring does not affect the production rate. Each time the molds are indexed, a mold will be filled with the resin system regardless of the number of index positions within the second zone.

The "flow" of molds through zone two requires a constant mold height, at least at the index position where the mold is filled. In order to accommodate different mold heights, as different types, sizes or ratings of electrical apparatus are encapsulated, the index position at which the molds are filled includes means for lifting or elevating the molds to a predetermined height, regardless of the mold height. Thus, mold heights may be changed at will, without deleteriously affecting the process.

Further, since certain electrical conductors to be encapsulated may be relatively small in size, it may be desirable to provide molds which will encapsulate a plurality of parts, with the mold having a plurality of sprues, each leading to one or more cavities within the mold. The disclosed apparatus will accommodate multiple sprue molds by incrementally indexing the molds within the pouring step index position.

Thus, the disclosed apparatus for encapsulating electrical apparatus in a pourable resin system, curable to a solid, includes a vacuum chamber having first, second and third zones, with the apparatus being operated by providing a predetermined vacuum in the second zone, loading a mold containing the electrical apparatus to be encapsulated in the first zone, providing a predetermined vacuum in the first zone, transferring the mold from the first to the second zone while maintaining the predetermined vacuum in the first and second zones, returning the first zone to atmospheric pressure, filling the mold with a resinous electrical insulating material in the second zone, providing the predetermined vacuum in the third zone, transferring the filled mold from the second to the third zones while maintaining the predetermined vacuum, returning the third zone to atmospheric pressure, and unloading the mold from the third zone. Other embodiments of this method include adding the steps of elevating the mold to a predetermined height in the second zone prior to the pouring step, to accommodate different mold heights; providing a plurality of index positions within the second zone, with the pouring step occurring at an intermediate index position, in order to provide the requisite time at vacuum for the mold and its contents, both prior to and after the pouring step; and, incrementally indexing the mold while at the pouring index position, in order to accommodate multiple sprue molds.

Figure 1:
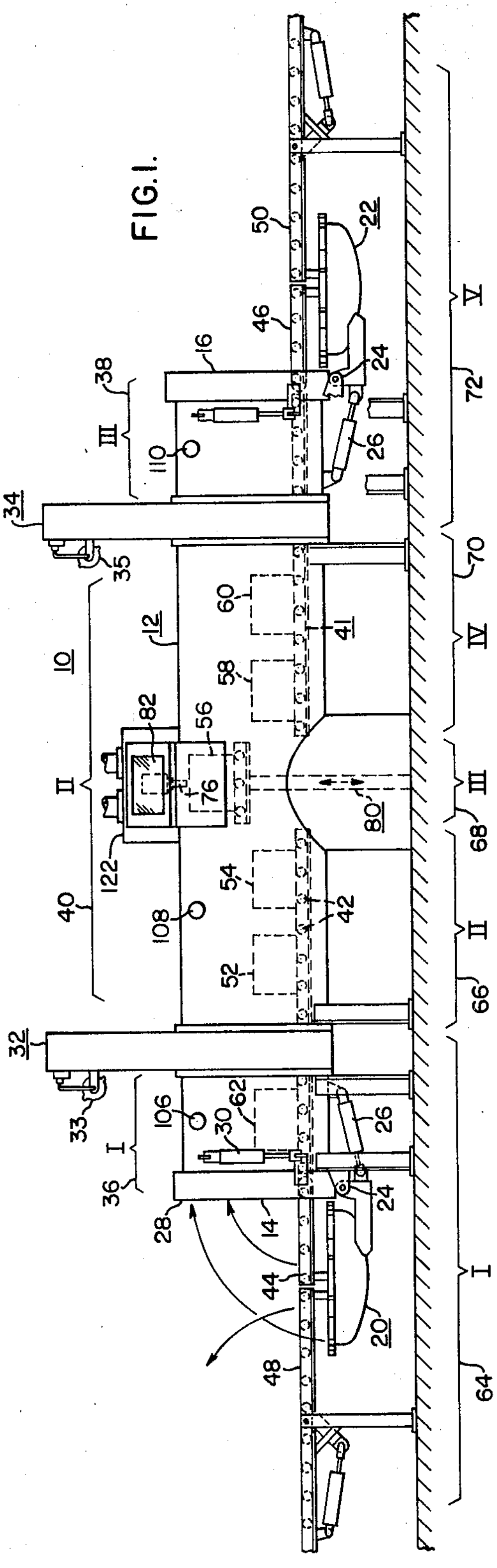
FIGURE 1 is an elevational view of a vacuum casting machine for encapsulating electrical apparatus in a castable resin system, constructed according to the teachings of the invention.
Figure 3:
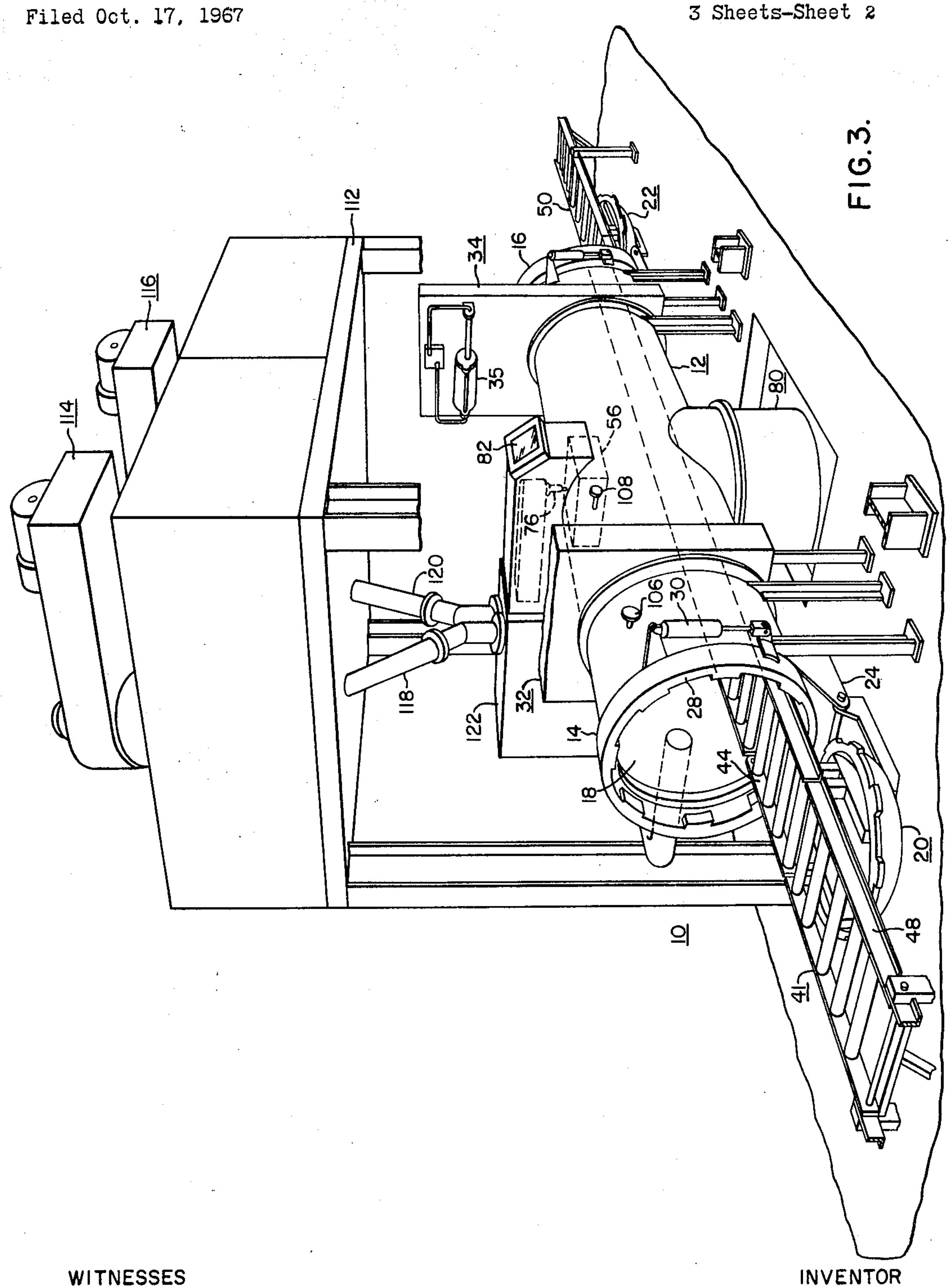
FIG. 3 is a perspective view of the vacuum casting machine shown in FIGS. 1 and 2.

New and improved apparatus for performing these methods is shown in FIGS. 1, 2 and 3. FIGS. 1 and 2 are elevational and plan views, respectively, of a new in-line vacuum casting machine for continually encapsulating electrical conductors in a cast solid electrical insulation system, and FIG. 3 is a perspective view of the vacuum casting machine shown in FIGS. 1 and 2, including suitable mixing, storing and pouring apparatus for the resin system.

Referring now to FIGS. 1, 2 and 3, there is shown a new in-line vacuum casting machine 10, constructed according to the teachings of the invention. Vacuum casting machine 10 includes a vacuum chamber 12, which is a tubular, elongated structure having first and second ends 14 and 16, respectively, a chamber 18, best shown in FIG. 3, which extends between its ends, and sealable doors 20 and 22 disposed at its ends 14 and 16, respectively. The doors 20 and 22 may be of any suitable construction which will close and seal the openings to chamber 18 at each end of the vacuum chamber 12. For example, as shown in FIGS. 1, 2 and 3, each of the doors, such as door 20, may have a hinge mechanism 24 which allows the door to swing downwardly 90° from its closed position, for purposes which will be hereinafter explained. The opening and closing of the door may be accomplished by an air cylinder 26. After the door is closed it may be locked and sealed by rotating a locking ring 28, which may be actuated by air cylinder 30.

According to the teachings of the invention, the vacuum chamber 12 is divided into three zones by gate valves 32 and 34, which are disposed perpendicular to the axis of the chamber 18, at predetermined spaced points, and which may be activated by air cylinders 33 and 35, respectively. The location of the gate valve 32 is near end 14 of the vacuum chamber 12, with the distance from the end being selected to provide a sufficient axial length to accommodate the longest mold which will be used. The portion of the vacuum chamber between door 20 and gate valve 32 will be called zone I, illustrated by the bracket sign 36 in FIG. 1. Zone I provides the loading chamber for the vacuum casting machine 10.

Gate valve 34 is located the same distance from end 16 as gate valve 32 is from end 14, with the portion of the chamber 18 between gate valve 34 and the door 22 being called zone III, illustrated by the bracket sign 38 in FIG. 1. Zone III provides the unload chamber for the vacuum casting machine 10.

The portion of the chamber 18 between the two gate valves 32 and 34 will be called zone II, illustrated by bracket sign 40 in FIG. 1. Zone II is the vacuum pouring chamber for the vacuum casting machine 10. The axial length of zone II is determined by the maximum mold length, the maximum production rate required, the mold pouring time, and the time that it is desired to have the mold and its contents subject to vacuum prior to and after the pouring step.

By providing and maintaining a predetermined vacuum in zone II, and by providing the predetermined vacuum at predetermined times in zones I and III, molds may be moved through the chamber 18 without disturbing the vacuum in zone II. For example, zone III may be evacuated to the vacuum of zone II, allowing the gate valve 34 to be opened. Molds may then be transferred between zones II and III. Gate valve 34 may then be closed, zone III brought back to atmospheric pressure, and door 22 opened to remove the mold which was transferred thereto from zone II. In like manner, zone I may be evacuated to the vacuum of zone II, allowing the gate valve 32 to be opened. Molds may then be transferred from zone I to zone II. Gate valve 32 may then be closed, zone I brought back to atmospheric pressure, door 20 opened, and a new mold transferred into zone I.

The vacuum casting machine 10 must have means for moving the molds through the chamber 18. Since the molds must stop, at least while they are being filled with the resin system, it is convenient to utilize an indexing type system, such as a conveyor 41 having a plurality of spaced power rollers 42. The conveyor 41 is disposed through the chamber 18 and is divided into a plurality of sections or segments, with each of the sections being independently controllable.

The conveyor system 41 may cooperate with a conveyor system at the operating site, by including segments 44 and 46 which are fixed to the inside of the doors 20 and 22, respectively. When the doors 20 and 22 are closed, conveyor segments 44 and 46 will pivot into a vertical position, along with their associated doors, and when the doors 20 and 22 are opened, the conveyor segments 44 and 46 will pivot into a horizontal position, over the ramp-like doors, providing extensions for the main conveyor system 41, which extensions extend outwardly from each end of the chamber 18. Sections 48 and 50 of the complementary conveyor at the operating site may be suitably hinged to fold out of the way when the doors 20 and 22 open, and then pivot into a horizontal position which provides extensions of the door responsive conveyor segments 44 and 46, after the doors 20 and 22 have opened.

As hereinbefore stated, the mold and its contents should be subjected to vacuum for a predetermined period of time prior to pouring, in order to remove as much air as possible therefrom and make the encapsulated apparatus as void free as possible, and the mold and its contents should also be subjected to the vacuum for a predetermined period of time after pouring the resin system, in order to remove any air which may be in the poured resin system. It is essential to remove as much air as possible, as air pockets within the solid insulation system may deleteriously affect the insulating value of the system, and may eventually cause it to fail. The additional time within zone II for the molds and their contents is acquired without affecting the cycle time of the apparatus, by selecting the axial length of zone II of chamber 18 to acommodate a plurality of molds prior to and after the pouring index position. For example, as shown in FIGS. 1 and 2, five molds 52, 54, 56, 58 and 60 are shown in zone II, with molds 52 and 54 preceding the pouring position, molds 58 and 60 following the pouring position, and with mold 56 being shown in the pouring index position. The molds may be conveniently moved from position to position within the chamber 18 by indexing the conveyor 41. Once the vacuum chamber 18 is fully loaded, a filled mold will be exited from the vacuum casting machine each indexing cycle of the conveyor 41. Thus, the number of index positions within zone II has no affect on the production rate capability of the casting machine 10. In the prior art batch type processes, the time required under vacuum prior to and after pouring seriously limits its production capabilities.

The conveyor 41 may have a single source of driving power, but it should have sections which are independently controllable, such as through a plurality of clutches. In other words, because of the alternate loading and unloading of the vacuum chamber 18, and alternate operation of the gate valves 32 and 34, it is not possible to merely index the complete conveyor system.

More specifically, when the pouring step has been completed, zone III is at the predetermined vacuum, and gate valve 34 is opened, the molds in the positions occupied by molds 56, 58 and 60 must be indexed one position, while the other molds in the vacuum casting machine 10 are stationary. This will index mold 60 into zone III, and it will leave the pouring index position empty, since mold 56 will index to the position occupied by mold 58. Now the gate valve 34 will close, zone III will be returned to atmospheric pressure, door 22 will open and the mold in zone III must be exited without affecting the other molds in the vacuum casting machine. After the pouring index position is vacant, zone I is at the predetermined vacuum, and gate valve 32 is opened, the molds in the position occupied by the mold 62 in zone I, and molds 52 and 54, must all be indexed one position. After they are indexed, gate valve 32 will close, zone I will be returned to atmospheric pressure, door 20 will open, and a new mold must be indexed into zone I. Thus, at least five independent sections of conveyor control are required, and they are labeled with Roman numerals and indicated by bracket signs in FIG. 1. Section I, indicated by the bracket sign 64 includes the stationary segment within zone I of the chamber 18, the door responsive segment 44, and, if desired, it may also include the pivotally disposed section 48 external to the vacuum casting machine 10.

Section II, indicated by the bracket sign 66, includes the conveyor segment within zone II between the gate valve 32 and the pouring index position 74. Conveyor section III, indicated by the bracket sign 68 includes the conveyor segment at the pouring index position 74. Conveyor section IV, indicated by bracket sign 70, includes the conveyor segment between the pouring index position 74 and the gate valve 34. Conveyor section V includes the stationary segment within zone III, the door responsive conveyor segment 46, and if desired, the pivotally disposed segment 50 which is external to the vacuum casting machine 10.

Thus, when a mold has been filled with the castable resin system, zone III is at the same vacuum as zone II, and gate valve 34 is open, conveyor sections III, IV and V will be energized to index the molds one index position. When gate valve 34 is closed, zone III is returned to atmospheric pressure, and door 22 opens, conveyor section V will be energized to remove the mold from vacuum zone III. When the pouring index position 74 is vacant, vacuum zone I is at the predetermined vacuum of vacuum zone II, and gate valve 32 is open, conveyor sections I, II and III will be energized to index the molds one position. When the gate valve 32 closes, zone I is brought back to atmospheric pressure, and the door opens, conveyor section I will be energized to load a new mold into vacuum zone I.

The pouring index position 74 must be independently controllable, as it operates with both conveyor sections II and IV. Independent control of conveyor section III is also essential if multiple sprue molds are utilized. For example, when relatively small encapsulated parts are to be cast, such as the low voltage bushing for a distribution transformer, it may be desirable to provide a mold which will cast a plurality of bushings. With multiple sprues leading to one or more cavities within the mold. In this instance, conveyor section III must not only be capable of indexing a mold into and out of this position, it must also be incrementally indexable, in order to index the multiple sprues into position under the pouring head 76.

Since the electrical apparatus encapsulated, such as windings, coils and bushings, will usually be made in different electrical ratings, the physical size of the encapsulated conductors may change, requiring molds of different sizes. Further, it may be desirable to encapsulate different generic types of electrical apparatus in casting machine 10, either in separate production runs, or indiscriminately mixed. Different mold sizes will again be necessary. Since the pouring head 76 must be in close proximity to the mold sprue, different mold heights would require that the pouring head be adjusted each time a mold having a different height occupies the pouring index position 74. This problem is solved, according to the teachings of the invention, by elevating or lifting the molds while they are in the pouring index position 74, with elevator means 80. Elevator means 80, which may be of the motorized jack screw type, or any other suitable type, lifts the conveyor section III and the mold, as shown in FIG. 1, so that the top of the mold is at a predetermined height, regardless of the mold height. Conveyor section III is incrementally indexable even in its elevated position.

The sensing of the mold height and subsequent controlled lift by the elevator means 80 may be automatic. For example, the elevator means 80 may automatically raise each mold until the top of the mold reaches a predetermined height, as determined by photocells, light switches, and the like. Or, since the casting machine 10 will have an operator in attendance, the lifting of the molds may be manually controlled by the operator through suitable controls. A sight port 82 is provided through the side of the vacuum chamber 12 adjacent the pouring index position 74, to allow the operator to observe the indexing and filling of the molds, and to manually control these steps if desired.

Suitable lighting means (not shown) may be disposed within the chamber 18 in order to facilitate the observation of the casting process by the operator.

In most applications, auxiliary heat will not be required within the vacuum chamber 18. However, vacuum chamber 18 may include suitable electrically heated elements or globars (not shown), which may be connected to a source of electrical potential and energized when required by a particular application.

In order to provide and maintain a predetermined vacuum in zone II of the vacuum casting machine 10, for example 5 millimeters of mercury, a vacuum pumping system 84 is connected to zone II through piping means 86 and an automatic ball valve 88. Since zone II requires pumping to remove the air from the molds, electrical continuous pumping to remove the air from the molds, electrical conductors and the poured resin system, it is preferable to utilize a separate vacuum system 90 to provide the selective vacuum in zones I and III. Since zones I and III do not require pumping simultaneously, a single vacuum system 90 may be used for both of the zones. Vacuum system 90 may be connected to zone I through piping means 92 and an automatic ball valve 94, and to zone III through piping means 96 and an automatic ball valve 98.

Vacuum zones I, II and III may each have a bleed valve 100, 102 and 104, respectively, for returning the zones to atmospheric pressure when required, and each zone may have a vacuum gauge 106, 108 and 110, respectively. Zone II may also have a recorder for continuously recording the vacuum in this zone, if desired.

In order to save floor space, and facilitate the transfer of the resin system from the resin supply to the vacuum casting machine 10, it is preferable to dispose the resin supply on a platform over the vacuum casting machine 10. For example, as shown in FIG. 3, a platform 112 may be disposed over the vacuum casting machine, which contains the supply of the resin system. The complete resin system may be mixed and stored in a single container on platform 112, or, as shown in FIG. 3, the resin system may be pre-mixed in two separate parts, with the two parts being blended immediately prior to use. This latter method is preferable with resin systems which have a relatively short shelf life after being completely mixed.

If the two part system is used, as shown in FIG. 3, two mixers 114 and 116 may be disposed on platform 112, into which the components of each separate part are introduced, mixed and stored. When the resin system is required by the casting machine 10, the two parts will be released through suitable conduits 118 and 120, respectively, into mixing and dispensing means 122. Predetermined amounts of the completed resin system may then be metered through the dispensing head 76 into the molds, as required by each mold. Since suitable mixers which may be used are well known in the art, and form no part of the invention, they will not be described in detail.

Any suitable resin system may be utilized, depending upon the electrical apparatus to be encapsulated and its requirements. For example, copending application Ser. No. 645,319, filed June 12, 1967, now U.S. Patent 3,433,-893, which is assigned to the same assignee as the present application, discloses a new and improved cast electrical bushing, and a new and improved resin system for use in the bushing. This copending application discloses an epoxy resin system, which includes an epoxy resin having an epoxy equivalent weight of about 125 to 450, selected from the group consisting of aromatic epoxy, novolac epoxy, cycloaliphatic epoxy, and mixtures thereof, a suitable epoxy curing agent, such as hexahydrophthalic anhydride, an epoxy accelerator, such as dimethyl-aminomethyl phenol, a fused quartz filler, and alumina trihydrate filler. To divide this particular system into two parts, with the two parts being blended immediately prior to usage, the epoxy resin and certain of the filler may be mixed to form the first part of the system, and the curing agent, accelerator, and the remainder of the filler may be mixed to provide the remaining portion of the system.

The liquid components of the resin system may be stored in heated containers, and as required may be automatically metered into their respective mixing means 114 and 116. The mixing containers, which are part of the mixing means 114 and 116, are also heated, for example to 100° C.±5° C., and they are evacuated to a predetermined pressure such as 5 millimeters of mercury. The vacuum may be maintained after each part of the resin system is mixed in the mixing means 114 and 116, or the vacuum may be removed after mixing, in order to facilitate the pouring of the two parts of the system. The mixed components will absorb very little air after being mixed, thus allowing the vacuum system 90 to be used for providing the vacuum in the mixing means 114 and 116, if desired. The two parts of the resin system disclosed in the copending application are held and poured at a temperature of 100° C.±5° C., with the two parts being blended in the blending and dispensing means 122, which is also heated to maintain the desired temperature of the resin system. After the resin system is dispensed into the mold, the mold and it contents is held at vacuum to remove any air which may be in the poured system. After the filled mold is removed from the vacuum casting machine 10, it is subjected to a gelling cycle to gel the poured resin system, after which it may be removed from the mold. The encapsulated electrical apparatus is then subjected to a post cure cycle. Typical gellation cycles for the resin system disclosed in the hereinbefore mentioned copending application, are in the range of 1–4 hours at a temperature of 100–120° C. Typical post cure cycles for this resin are in the range of 4–8 hours at 150° C. The gellation and curing cycles may be provided by suitable heating means, such as ovens.

Other suitable resin systems which may be used are disclosed in copending applications Ser. Nos. 456,038, now abandoned, 447,237, now abandoned, and 645,320, now U.S. Patent 3,434,087, filed May 6, 1965, Apr. 12, 1965, and June 12, 1967, respectively, all of which are assigned to the same assignee as the present application. As hereinbefore stated, however, these resin systems are merely examples of suitable resin systems which may be used, as any encapsulating resin system for electrical apparatus may be used with the vacuum casting machine 10.

Figure 4:
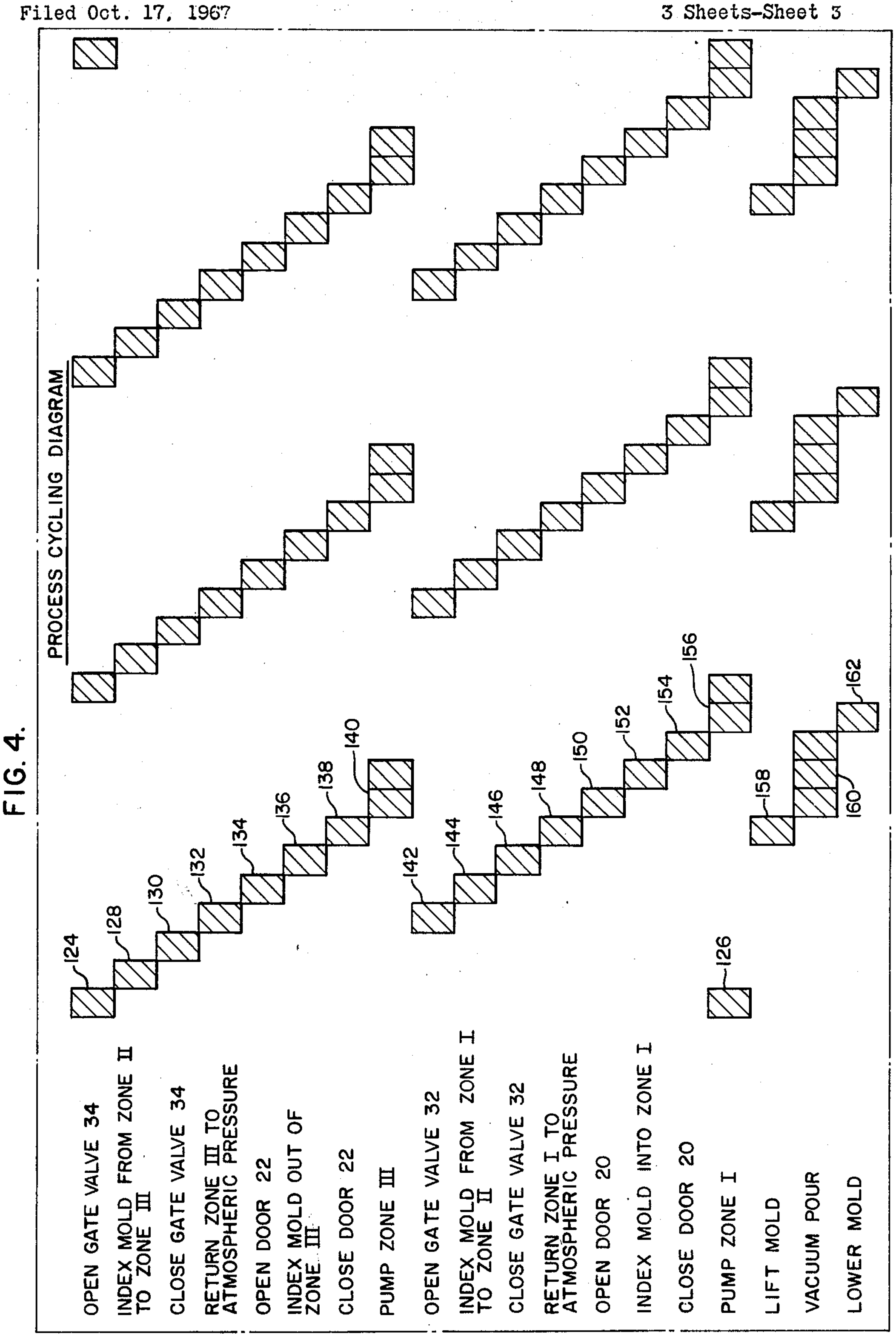
FIG. 4 is a graph illustrating the process cycling relationships of the various steps performed by the vacuum casting machine shown in FIGS. 1, 2 and 3.

In describing the complete operation of vacuum casting machine 10, the process of cycling diagram shown in FIG. 4 will be referred to. The process cycling diagram functionally represents the time required for the various steps of the process, with no attempt to accurately indicate relative times, as they depend upon the particular application. However, the diagram is useful in illustrating how certain steps of the process may be performed simultaneously, to reduce the overall cycle time of the machine.

The process cycling diagram of FIG. 4 starts with the doors 20 and 22 closed, the gate valve 32 and 34 closed, a mold in zone I, molds at each index position within zone II, the mold at the pouring index station 74 filled and in the lowered position, zone III empty, zones II and III at a predetermined vacuum, such as 5 millimeters of mercury, and zone I in the process of being evacuated by vacuum system 90. The first step, indicated by block 124, is to open the gate valve 34 between zones II and III. As indicated by block 126, vacuum zone I may still be being pumped by vacuum system 90 at this time. The next step, indicated by block 128, is to index a mold from zone II to zone III, by indexing conveyor sections III, IV and V. Gate valve 34 may then be closed, indicated by block 130, zone III may be returned to atmospheric pressure via its bleed valve 104, indicated by block 132, door 22 may then be opened, indicated by block 134, and the mold may be removed from zone III by operating conveyor section V, indicated by block 136. Door 22 may then be closed, indicated by block 138, and valve 98 may be opened to pump a vacuum in zone III, indicated by block 140.

As soon as gate valve 34 closes, previously indicated by block 130, gate valve 32 may be opened, indicated by block 142, and the mold in zone I indexed into zone II, by indexing conveyor sections I, II and III, indicated by block 144. This indexes a mold into the pouring position 74. Gate valve 32 may then be closed, indicated by block 146, zone I may be returned to atmospheric pressure via its bleed valve, indicated by block 148, door 20 may be opened, indicated by block 150, a mold may be indexed into zone I by indexing conveyor section I, indicated by block 152, door 20 may be closed, indicated by block 154, and valve 94 may be opened to connect zone I to vacuum system 90, indicated by block 156.

As soon as gate valve 32 closes, the mold which has been indexed into the pouring position may be lifted to a predetermined height, preparatory to pouring the resin system therein, indicated by block 158, the resin system may then be poured in the mold, indicated by block 160, and the mold may then be lowered, indicated by block 162. If the mold has multiple sprues, the vacuum pouring step would also include incrementally indexing the mold while it is in the elevated position.

As indicated in FIG. 4, this cycle will then be repeated continually, providing a filled mold at the exit end of the vacuum casting machine 10, after each cycle. A typical cycle time is two minutes, but this may vary widely, depending upon the particular electrical apparatus to be encapsulated. It should be noted how the various steps in the cycle overlap, reducing the overall cycle time of the vacuum casting machine. In addition, the vacuum casting machine subjects the mold and its contents to the vacuum for predetermined periods of time prior to and after pouring, without these times appearing in the cycling time of the machine.

In summary, there has been disclosed new and improved apparatus for continually vacuum casting electrical apparatus in a pourable cast resin insulating system, which overcome the disadvantages of prior art vacuum casting apparatus. The disclosed apparatus makes it passible to substantially increase the production rate over batch type methods, without concomitantly increasing the number of operating personnel required, the floor space required, and the amount and cost of the casting apparatus. Therefore, substantial reduction may be made in the cost of each encapsulated part, compared with prior art methods.

Since numerous changes may be made in the above described apparatus and different embodiments of the invention may be made without departing from the spirit thereof, it is intended that all matter contained in the foregoing description or shown in the accompanying drawings, shall be interpreted as illustrative, and not in a limiting sense.

I claim as my invention:

1. A method of encapsulating electrical apparatus in a cast resinous electrical insulating system, comprising the steps of:

providing a vacuum chamber having first, second and third zones,
providing a predetermined vacuum in the second zone,
loading a mold containing the electrical apparatus to be encapsulated into the first zone,
providing said predetermined vacuum in the first zone,
transferring said mold from the first to the second zone while maintaining the predetermined vacuum in the first and second zones,
returning the first zone to atmospheric pressure,
filling the mold with a resinous insulating system in the second zone,
providing said predetermined vacuum in the third zone,
transferring the mold from the second to the third zones while maintaining the predetermined vacuum,
returning the third zone to atmospheric pressure,
and unloading the mold from the third zone.

2. The method of claim 1 wherein the step of filling the mold with a resinous insulating system in the second zone includes the step of lifting the mold to a predetermined height, prior to the filling step, and lowering the mold to its original position after being filled.

3. The method of claim 1 including the step of indexing the mold through a plurality of positions within the second zone, with the filling step occurring at a predetermined intermediate index position within the second zone.

4. The method of claim 3 including the step of elevating the mold at the predetermined intermediate index position at which the filling step occurs.

5. The method of claim 3 wherein the mold has a plurality of sprues to be filled, including the step of incrementally indexing the mold while at the intermediate index position to allow the filling step to fill all of the sprues.

6. The method of claim 5 including the step of elevating the mold at the predetermined intermediate index position at which the filling step occurs.

7. A vacuum casting machine for encapsulating electrical apparatus in a castable electrical insulation system, comprising:

a vacuum chamber including first and second ends, first and second sealable doors at its first and second ends, respectively, and first and second valve means disposed within said vacuum chamber to provide first, second and third zones within said vacuum chamber,
indexing means for indexing molds through the first, second and third zones of said vacuum chamber,
metering means disposed within the second zone of said vacuum chamber adapted for connection to a supply of castable electrical insulation, for dispensing the resinous insulation into the molds,
vacuum means for selectively providing a predetermined vacuum in the zones of said vacuum chamber,
and means sequencing the operation of said indexing means, said first and second doors, said first and second valve means, and said vacuum means, to continuously maintain said predetermined vacuum in the second zone while the molds are indexed through the first, second and third zones of the vacuum chamber.

8. The vacuum casting machine of claim 7 wherein the vacuum means includes first and second vacuum systems, with the first vacuum system providing the predetermined vacuum in the second zone of the vacuum chamber, and the second vacuum system being adapted to selectively provide the predetermined vacuum in the first and third zones of the vacuum chamber.

9. The vacuum casting machine of claim 7 including means for elevating the molds to a predetermined height in the second zone of the vacuum chamber, to provide a constant mold height regardless of the mold size and facilitate the filling of the molds by the metering means.

10. The vacuum casting machine of claim 7 wherein the second zone of the vacuum chamber includes a plurality of index positions, with the filling of the molds occurring at an intermediate index position, enabling the mold to be subjected to the predetermined vacuum for predetermined periods of time before and after being filled with the castable electrical insulation.

11. The vacuum casting machine of claim 10 wherein the indexing means is a conveyor which is disposed in the first, second and third zones of the vacuum chamber, said conveyor having a plurality of sections which are independently indexable, including a first section which includes the index positions within the second zone of the vacuum chamber prior to the filling index position, a second section which includes the pouring index position, and a third section which includes the index positions in the second zone of the vacuum chamber which are subsequent to the filling index position.

12. The vacuum casting machine of claim 11 wherein the second section of the conveyor is incrementally indexable to enable multiple sprue molds to be filled.

13. The vacuum casting machine of claim 11 wherein the first section of the conveyor also includes the portion of the conveyor which is within the first zone of the vacuum chamber, and the third section also includes the portion of the conveyor which is within the third zone of the vacuum chamber.

14. The vacuum casting machine of claim 7 wherein the conveyor includes first and second pivotally disposed sections associated with the first and second doors, respectively, which pivot into a substantially vertical position within the first and third zones, respectively, of the vacuum chamber, when the doors are closed, and which pivot downwardly to provide continuous, horizontal extensions of the conveyor when the doors are opened.

References Cited

UNITED STATES PATENTS

| | | | |
|---|---|---|---|
| 1,355,407 | 10/1920 | Meehan | 25—142 |
| 2,218,935 | 10/1940 | Ingersoll | 25—142 X |
| 2,294,476 | 6/1942 | Mooney | 18—26 XR |
| 2,893,061 | 7/1959 | Terry | 264—102 |
| 3,253,303 | 5/1966 | Bradt | 264—102 XR |
| 3,381,339 | 5/1968 | Trelease | 18—26 |

WILLIAM J. STEPHENSON, Primary Examiner

U.S. Cl. X.R.

18—5, 26

UNITED STATES PATENT OFFICE
CERTIFICATE OF CORRECTION

Patent No. 3,507,004 Dated April 21, 1970

Inventor(s) Alexander Taleff

It is certified that error appears in the above-identified patent and that said Letters Patent are hereby corrected as shown below:

Column 9, line 58, beginning with "1. A method of" cancel all to and including "filing step occurs." in column 10, line 24. Column 10, line 25, "7." should read -- 1. --; line 49, "8." should read -- 2.--; and "7" should read -- 1 --; line 56, "9." should read -- 3. --; and "7" should read -- 1 --; line 61, "10." should read -- 4. --; and "7" should read -- 1 --; line 68, "11." should read -- 5. --; and "10" should read -- 4 --; Column 11, line 4, "12." should read -- 6. --; and "11" should read -- 5 --; line 7, "13." should read -- 7. --; and "11" should read -- 5 --; line 13, "14." should read -- 8. --; and "7" should read -- 1 --. In the heading to the printed specification, line 9, "14 Claims" should read -- 8 Claims --.

Signed and sealed this 16th day of March 1971.

(SEAL)
Attest:

EDWARD M.FLETCHER,JR.
Attesting Officer

WILLIAM E. SCHUYLER, JR.
Commissioner of Patents